(12) United States Patent
Tan et al.

(10) Patent No.: US 7,093,043 B2
(45) Date of Patent: Aug. 15, 2006

(54) DATA ARRAY HAVING REDUNDANCY MESSAGING BETWEEN ARRAY CONTROLLERS OVER THE HOST BUS

(75) Inventors: Choon-Seng Tan, Houston, TX (US); Greg J. Pellegrino, Tomball, TX (US); Erick Labarca, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 404 days.

(21) Appl. No.: 10/034,138

(22) Filed: Dec. 27, 2001

(65) Prior Publication Data

US 2003/0126347 A1 Jul. 3, 2003

(51) Int. Cl.
*G06F 13/36* (2006.01)
*G06F 12/00* (2006.01)

(52) U.S. Cl. ................ 710/104; 710/305; 711/162
(58) Field of Classification Search ............. 710/35.1, 710/305–310, 15, 8, 18, 104; 711/114, 162
See application file for complete search history.

(56) References Cited

U.S. PATENT DOCUMENTS

| | | | |
|---|---|---|---|
| 5,142,683 A * | 8/1992 | Burkhardt et al. .......... 709/215 |
| 5,659,718 A * | 8/1997 | Osman et al. .............. 713/400 |
| 5,675,807 A * | 10/1997 | Iswandhi et al. .......... 710/260 |
| 5,699,510 A * | 12/1997 | Petersen et al. ............. 714/54 |
| 5,787,459 A * | 7/1998 | Stallmo et al. ............. 711/112 |
| 5,896,492 A * | 4/1999 | Chong, Jr. ..................... 714/3 |
| 5,937,428 A | 8/1999 | Jantz |
| 5,975,738 A * | 11/1999 | DeKoning et al. ............ 700/79 |
| 6,061,752 A | 5/2000 | Jones et al. |
| 6,065,096 A | 5/2000 | Day et al. |
| 6,073,218 A | 6/2000 | DeKoning et al. |
| 6,085,333 A * | 7/2000 | DeKoning et al. ............. 714/7 |
| 6,094,699 A * | 7/2000 | Surugucchi et al. ........ 710/314 |
| 6,115,803 A * | 9/2000 | Hayashi et al. ............... 712/25 |
| 6,148,414 A | 11/2000 | Brown et al. |
| 6,151,641 A * | 11/2000 | Herbert ....................... 710/22 |
| 6,219,753 B1 | 4/2001 | Richardson |
| 6,230,240 B1 * | 5/2001 | Shrader et al. ............. 711/114 |
| 6,289,398 B1 | 9/2001 | Stallmo et al. |
| 6,311,256 B1 | 10/2001 | Halligan et al. |
| 6,546,459 B1 * | 4/2003 | Rust et al. .................. 711/114 |
| 6,606,683 B1 * | 8/2003 | Mori .......................... 711/114 |

* cited by examiner

*Primary Examiner*—Rehana Perveen
*Assistant Examiner*—Trisha Vu (57) ABSTRACT

A data array system, and inter-controller-link messaging method, for controlling redundant access to a storage device and providing inter-controller communication without a dedicated controller link. The host has a host bus, such as a PCI bus, and the system includes an active and a standby controller that are linked to the host bus and use the host bus for an inter-controller-link. A messaging mechanism transmits messages and data over the host bus from the active to the standby controller. The standby controller includes message and data buffers for storing the messages and data written and a message queue in which the active controller writes a signal identifier indicating that a new message has been written and defining the message for processing by the standby controller (such as a message-only transfer, a partial or all data transfer, or as a data-only transfer).

25 Claims, 3 Drawing Sheets

DATA ARRAY HAVING REDUNDANCY MESSAGING BETWEEN ARRAY CONTROLLERS OVER THE HOST BUS

BACKGROUND OF THE INVENTION

1. Field of the Invention

The present invention relates, in general, to data storage networking technology, and more particularly, to a system and method for communicatively-linking redundant data array controllers using the host bus, and more particularly, the host PCI bus, as the inter-controller-link and for controlling redundant messaging or communications at the array controllers rather than at the host.

2. Relevant Background

Modern mass storage subsystems are continuing to provide increasing storage capacities to fulfill user demands from host computer system applications. This reliance on large capacity mass storage has led to increased demands for enhanced reliability. Various storage device configurations are used to meet the demands for higher storage capacity while maintaining or enhancing reliability of the mass storage subsystems.

One solution to these mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error correction codes, and the like. These subsystems are typically referred to as redundant arrays of inexpensive (or independent) disks (or more commonly by the acronym RAID). There are five "levels" of standard geometries defined for RAID. The simplest array, a RAID level 1 system, comprises one or more disks for storing data and an equal number of additional "mirror" disks for storing copies of the information written to the data disks. The remaining RAID levels, identified as RAID level 2, 3, 4 and 5 systems, segment the data into portions for storage across several data disks. One or more additional disks are utilized to store error check or parity information.

RAID storage subsystems typically utilize a control module or array controller that at least partially shields the user or host system or server from the details of managing the redundant array. The array controller makes the subsystem appear to the host computer as a set of highly reliable, high capacity disk drives independent of the physical drive size and characteristics. In fact, the array controller may distribute the host-supplied data across a plurality of the small independent drives with redundancy and error checking information so as to improve subsystem reliability. Frequently RAID subsystems provide large cache memory structures to further improve the performance of the RAID subsystem. The cache memory is associated with the control array such that the storage blocks on the disk array are mapped to blocks in the cache. This mapping is also transparent to the host. The host system simply requests blocks of data to be read or written and the RAID controller manipulates the disk array and cache memory as required.

To further improve reliability, redundant array controllers are sometimes provided to reduce the failure rate of the subsystem due to control electronics failures. In some redundant architectures, pairs of control modules are configured such that they control the same physical array of disk drives. A cache memory module is associated with each of the redundant pair of control modules. When one of the redundant pair of control modules fails, the other stands ready to assume control to carry on operations on behalf of I/O requests. Typically, one controller, often referred to as a master or the active controller, essentially processes all I/O requests for the RAID subsystem. The other redundant controller, often referred to as a slave or passive controller, is simply operable to maintain a consistent mirrored status by communicating with the active controller. The caches are mirrored on each controller, and it is desirable that writes posted to the active controller are mirrored on the standby or passive controller. In the case of dual active controller arrangements, the passive controller may manipulate data on separate logical units and this may occur even on the same drive set. For any particular RAID logical unit (a group of disk drives configured to be managed as a RAID array), there is a single active controller responsible for processing of all I/O requests directed thereto. The passive controller does not concurrently manipulate data on the same RAID logical unit.

The data storage industry continues to struggle how most efficiently to facilitate controller redundancy. A key design issue arises because the redundant control modules must communicate with one another to assure that the cache modules are synchronized and to provide proper redundancy. It is common in the art to require host intervention to coordinate failover operations among the controllers and to facilitate communications, i.e., to provide a host-driven redundancy scheme. Host interaction and control over communications may be undesirable because it reduces host processing efficiency as processing time is used to control and monitor controller communications and limits host interoperability as each array controller platform may vary significantly. Further, host interaction and control for redundancy is not readily available and is often expensive. Host involvement to maintain mirrored caches requires data movement from the host (e.g., the host processor, host memory, host North Bridge, and Peripheral Component Interconnect (PCI) bus) twice, once to each controller, and therefore, is undesirable because it reduces available bandwidth by half.

A number of arrangements currently exist for allowing the active and passive controller to communicate. In one arrangement, the host system needs to provide two special and dedicated extended bus slots (such as PCI extended slots) for host to controller communications and using a channel on the controller (such as a Small Computer System Interface (SCSI) channel) and a shared bus for the link between the controllers. The provision of extended bus slots is not common in host devices such as servers, and this arrangement requires the host to include controller control software and uses up a communication channel on each controller. Similarly, some arrangements call for a separate bus (such as a SCSI bus) or storage communications network (such as Fibre Channel (FC), Gigabit Ethernet, and the like) that provides a communication path between the host and each of the redundant controllers. Again, this requires controller command or communication mechanisms to be run by the host or in peripheral host devices and often requires additional hardware, such as host bus adapters (HBAs) to provide a link between the host bus and the communication link to the controllers. Further, the controllers still require a dedicated or shared bus and communication channel to provide inter-controller communications.

Hence, there remains a need for an improved system and method for providing array controller redundancy and communicatively linking the pair of redundant array controllers. Preferably, such a system and method would reduce processing demands on host devices, reduce the need for dedicated or specialized communication busses and communication ports, and increase interchangeability of hosts.

SUMMARY OF THE INVENTION

The present invention addresses the above discussed and additional problems by a data array system that utilizes an inter-controller-link (ICL) method for controlling communication between two array controllers configured in a redundant capacity. Significantly, the ICL method of the invention uses the host bus (e.g., a PCI bus) to transfer data and controller information between the controllers. In one embodiment, the ICL method is performed by a redundancy messaging device or mechanism embedded in the firmware of each of the array controllers. The data array system does not require a host with dedicate PCI slots in order to support redundant storage array controllers, which makes the system and method of the invention useful with nearly all PCI-backplaned servers. Further, the data array system does not require additional cables, which reduces end-user burden and reduces number of physical components that can break or otherwise require maintenance or cause system failures. Additionally, since the ICL method uses the host bus, the ICL method enables the array controller to utilize all of its communication channels, such as SCSI channels, for input/output (I/O) or other uses rather than for inter-controller communications.

More particularly, a data array system is provided for controlling redundant access to a storage device, such as an array of hard disk drives. The host has a host bus, such as a PCI bus, and the system includes an active and a standby controller that are linked to the host bus and use the host bus for an inter-controller-link. The active controller includes a messaging mechanism for transmitting messages and data over the host bus to the standby controller. The standby controller includes message and data buffers for storing the messages and data written over the host bus by the active controller. The standby controller further includes a command/reply queue in which the active controller writes a signal identifier indicating that a new message has been written and defining the message for processing by the standby controller (such as a message-only transfer, a partial or all data transfer, or as a data-only transfer).

The active controller uses its messaging mechanism to drive or assert an interrupt to the standby controller which in turn uses its messaging mechanism to receive the interrupt and respond by checking its message queue. When a new message is indicated, the standby messaging mechanism processes the message and if present, moves data from data buffer to a more permanent memory. The standby messaging mechanism then functions to write a reply in a reply queue maintained by the active controller and drive an interrupt over the host bus to the active controller. The active messaging mechanism recognizes the interrupt and responds by checking its reply queue and then beginning another message and data transaction or transfer session over the host bus.

According to yet another important feature of the invention, the messaging mechanism uses controller memory that is mapable externally on the host bus, e.g., the PCI bus. In a preferred embodiment, the controller memory is configured to allow an address range to be specified such that writes to the specified address range results in generation of interrupts to the controller of which the controller memory resides. This can be handled by the messaging mechanism itself or by a memory controller (such as a memory controller on a RAID controller). In operation, one controller in the redundancy pair writes data as a message directly to the other controller's memory which if in the specified range causes an interrupt to be driven local to the second controller from it's own memory. In PCI host bus embodiments, this is a very useful feature of the invention as there are no dedicated PCI signals that allow one PCI card to interrupt another PCI card, and this local interrupt feature of the invention does not require a PCI signal to cause such an interrupt.

DETAILED DESCRIPTION OF THE PREFERRED EMBODIMENTS

The present invention is directed toward a data array system that utilizes the host bus, typically a PCI bus, as an inter-controller-link (ICL), between two data storage or data array controllers in arranged and configured for redundant control and access to one or more data storage devices (such as an array of disk drive assemblies). Each data array controller includes one or more hardware or software devices that are useful for providing unique ICL messaging between the active and standby array controllers. In one embodiment, a redundancy messaging mechanism is provided in the firmware of each array controller to assert and sample messages on the host bus to offload inter-controller communication control from the host of the data array system. The use of the host bus as the ICL also frees I/O ports and channels on the array controllers for communication with additional data storage devices and other devices in the data array system.

Figure 1:
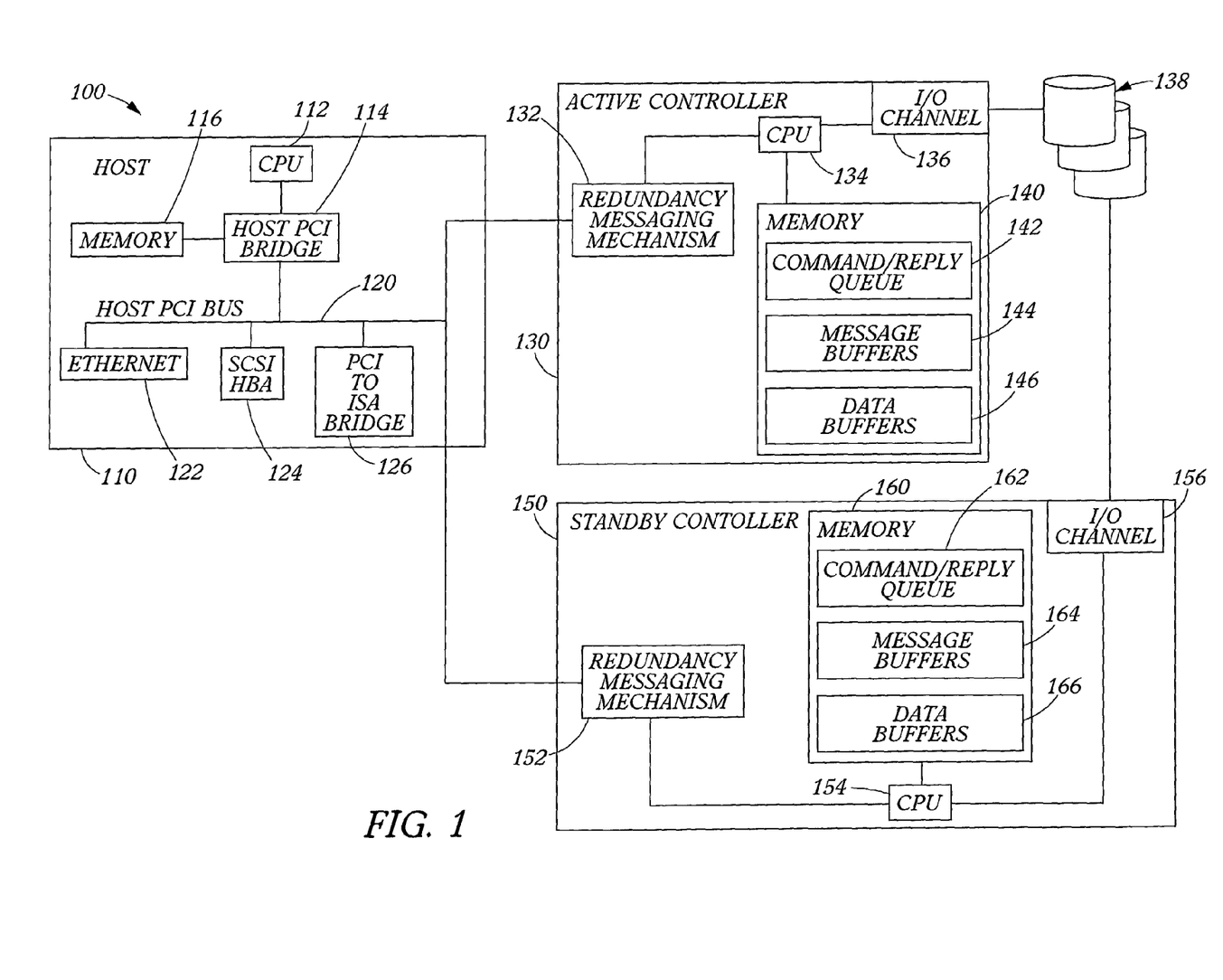
FIG. 1 illustrates a data array system according to the present invention illustrating the use of the host PCI bus as an inter-controller-link (ICL) between an active and standby controller.

The following discussion stresses the benefit of the data array system and ICL messaging method of the invention in the environment of a PCI host computer system (such as a PCI configured server) but other bus specifications may be used to practice the invention. The description begins with a description of an exemplary data array system with reference to FIG. 1 illustrating the use of the host bus as the ICL between redundant controllers. The communication flow and operation of the redundant controllers, and specifically, the redundant messaging mechanisms, is described in detail with reference to FIG. 2. Next, the data transfer modes supported by the redundancy messaging mechanisms is described with reference to FIG. 3.

An exemplary data array system 100 according to the present invention is illustrated in FIG. 1. While the system 100 is illustrative of one embodiment, the techniques according to the invention can be implemented in a wide variety of computer systems. The data array system 100 acts as a server for redundantly controlling a mass storage peripheral. More specifically, the data array system 100 includes a host 110 that in one embodiment is a peripheral component interconnect (PCI) bus and industry standard architecture (ISA) bus machine. During operation, the host 110 provides applications and other peripheral devices with access to data storage devices 138 (such as disks operated in a RAID configuration or other storage device arrangement) via either an active controller 130 or a standby controller 150.

The host 110 may take numerous arrangements and include numerous devices known in the art that are useful for host computing systems. As shown, the host 110 includes a central processing unit (CPU) 112 and a host PCI bridge (frequently referred to as the North Bridge) connecting the host processor 112 to the root PCI bus 120 and to host memory 116. The PCI bus 120 can be populated with adapters and devices requiring fast access to each other, such as the Ethernet (or other networking connector) 122, the SCSI host bus adapter (HBA) 124 and the PCI to ISA bridge (sometimes, called the South Bridge, and typically including an interrupt controller, an IDE controller, a USB host controller, and a DMA controller.

Significantly, the PCI bus 120 is linked to the active controller 130 and the standby controller 150 (such as with a direct link, with PCI slots, or other connection that allows the controllers 130, 150 access to messages and data on the host PCI bus 120). As will become clear, this direct link enables the host PCI bus 120 to be used by the controllers 130, 150 as the ICL between them for transmitting messages, data, and replies according to the ICL messaging method of the invention.

Generally, all read and write transfers over the host PCI bus 120 are performed as burst transfers, including those between the active and standby controllers 130, 150. One device linked to the host PCI bus 120 is made the bus master and the bus master determines the length of the burst. The target device is given the start address and the transaction type at the start of the transaction but is not told the transfer length. As the master becomes ready to transfer each data item, it informs the target if this data item is the last one in the burst, and the transaction or messaging completes when the final data item has been transferred from the bus master to the target (such as the active controller 130 to the standby controller 150 or vice versa).

At a given instant in time, one or more PCI bus master devices (each device on the host PCI bus may be configured as a PCI bus master and at least as a target with the controllers 130, 150 being configured to be both master and target devices) may desire use of the host PCI bus 120 to perform a data transfer and may assert a request output on the bus 120 to inform the bus arbiter (typically, integrated in the host PCI bridge 114) of its pending request. Based on an arbitration algorithm in the arbiter, a grant signal is sampled by the requesting master device with each master device being linked with separate request and grant traces. The specific arbitration algorithm utilized within system 100 is not significant to the invention as long as the active and standby controllers 130, 150 are connected to the arbiter (such as the host PCI bridge 114) to be granted bus master status to communicate with the other one of the controllers 130, 150 during ICL or redundancy messaging.

Additionally, the host PCI bus 120 and system 100 should be configured to the comply with one or more standards or specification accepted within the computer industry, such as the 2.1 PCI, 2.2 PCI, or new specification and be able to support operations in the range of 0 to 66 MHz or other acceptable signal clock frequencies. The ICL or redundancy messaging generally utilizes the master and target signal sets and commands described in detail by PCI specifications. The supported signal sets include address/data and command signals, interface control signals, system signals, arbitration signals, error reporting, and interrupt request signals. The commands generally include interrupt acknowledge, special cycle, I/O read, I/O write, memory read, memory write, configuration read, configuration write, memory read multiple, dual address cycle, memory read line, and memory write-and-invalidate. More particularly, the controllers 130, 150 are preferably PCI-compliant master and target devices adapted to assert and sample/process this set or a subset of these signals and commands to facilitate communication between the controllers 130, 150 over the host PCI bus 120.

According to an important aspect of the invention, the data array system 100 further includes an active or master controller 130 and a standby or slave controller 150 linked to the host 110 via the host PCI bus 120. The controllers 130, 150 are configured to provide redundant control and access paths to the data storage devices 138 linked to the I/O channels or ports 136, 156 of the controllers 130, 150. The controllers 130, 150 may be configured as necessary to support the data storage devices 138 and the host 110 and may be storage controllers configured for Fibre Channel (FC) storage links and storage devices 138, for SCSI devices 138 and links, or other useful storage devices and data communication links. The controller CPUs 134, 154 are preferably selected and firmware and hardware to provide the desired controller configuration, such as a RAID array controller and the like for use with optical storage devices, tape drives, and other storage devices.

The active and standby controllers 130, 150 are configured to control and manage messaging and data transfers between themselves over the host PCI bus 120 to facilitate a redundant controller configuration in the data array system 100. To this end, the controllers 130, 150 include redundancy controller mechanisms 132, 152, respectfully, that are operable to provide the ICL or redundancy messaging method of the invention (as is described in detail with reference to FIGS. 2 and 3). The mechanisms 132, 152 may be provided in hardware and more preferably, are provided as firmware embedded in the controllers 130, 150. The controllers 130, 150 further include memory 140, 160 (which may also be provided in peripheral devices linked to the controllers 130, 150) to provide storage useful for the messaging method. The memory 140, 160 includes at least a command/reply queue 142, 162, message buffers 144, 164, and data buffers 146, 166 whose uses are described as part of the operation of the controllers 130, 150. A direct memory access (DMA) controller is typically also supported and/or included in the controllers 130, 150.

Figure 2:
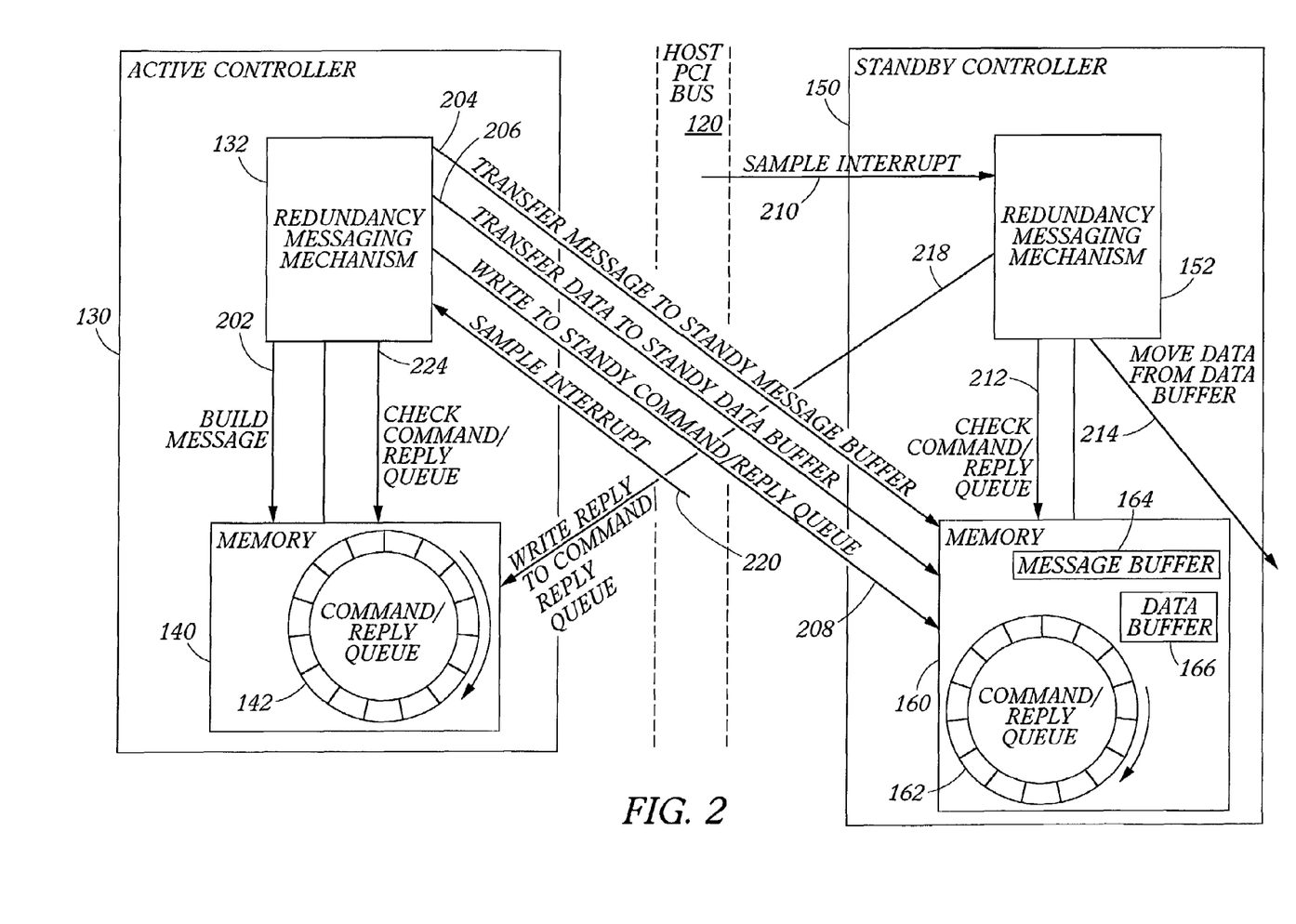
FIG. 2 is a simplified block diagram illustrating the communication flow of controller messages and data between an active controller and a standby controller and managed by redundancy messaging mechanisms provided in each controller.
Figure 3:
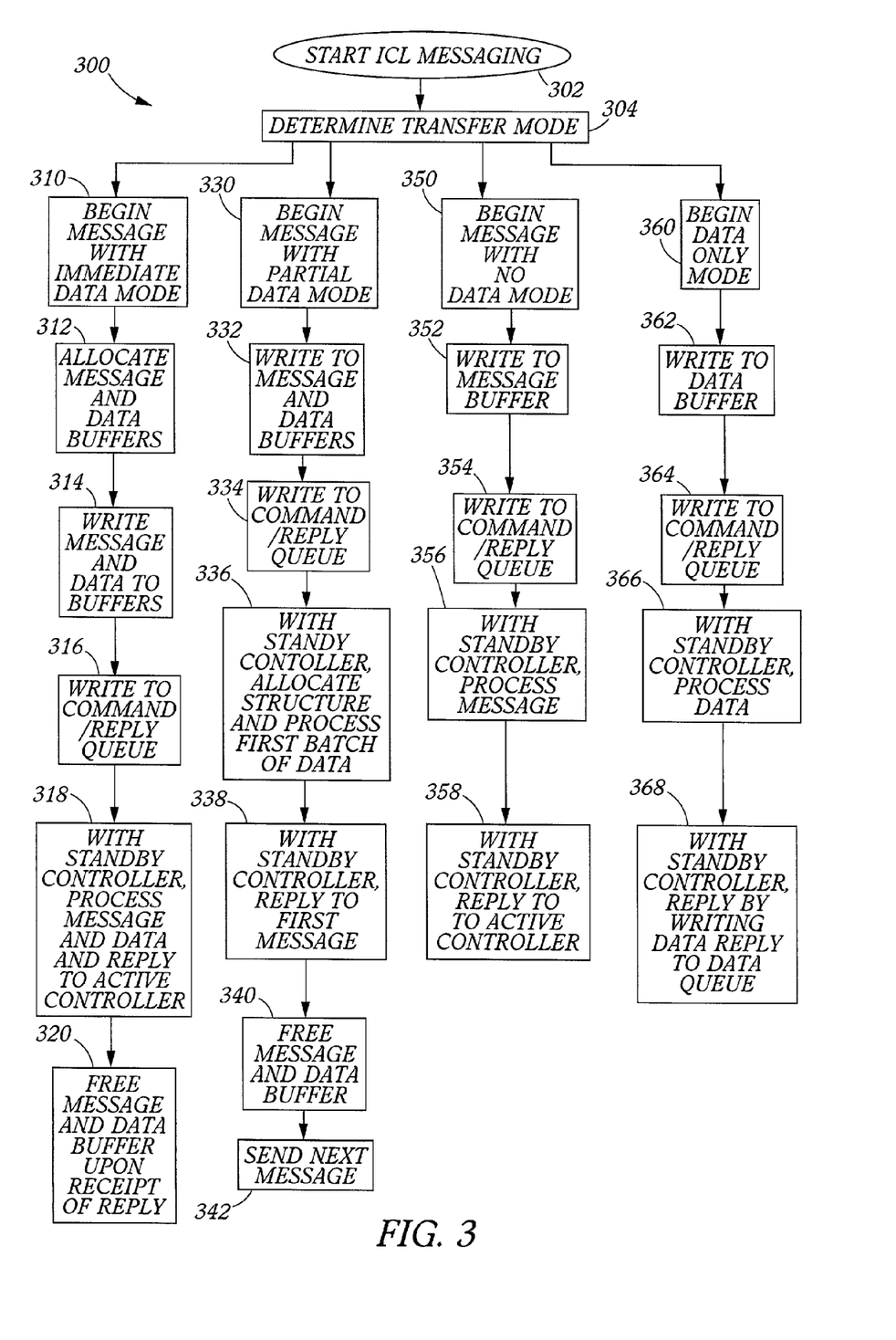
FIG. 3 is flow diagram of a portion of the ICL method showing the processing of four exemplary transfer modes by the redundancy messaging mechanisms of FIG. 1.

The operation of the controllers 130, 150 and the redundancy messaging mechanisms 132, 152 are now discussed more fully with reference to FIGS. 2 and 3 with emphasis placed on the features of the ICL messaging method of the present invention. FIG. 2 generally illustrates important portions of the data flow that typically occurs during inter-controller communications. The data transfer or messaging transaction begins at 202 with the redundancy messaging mechanism 132 of the active controller 130 (note, the role of the controllers 130, 150 may reverse during operations) building a message to be transferred to the standby controller 150 and storing the message in its memory 140 (such as in the message and/or data buffer 144, 146 or elsewhere in memory 140).

At 204, the message is transferred by the redundancy messaging mechanism 132 via the host PCI bus 120 to the message buffer 164 in memory 160 of the standby controller 150. Both of the redundancy messaging mechanisms 132, 152 being PCI-compliant and following PCI protocols of transactions on the bus 120 (e.g., asserting and deasserting signals and commands on the bus 120 to initiate, transfer, and terminate signals and data transfers). For example, the message is built to identify the standby controller 150 as the target device on the host PCI bus 120 and the standby controller 150 via the redundancy messaging controller 152 acts to identify messages for which it is the target and to latch onto memory addresses provided in such signals/messages. The ICL messaging process continues with the optional transfer of data to the standby data buffer 166 via the host PCI bus 120 (note, not all ICL transactions involve the transfer of data between the controllers 130, 150). At 208, the redundancy messaging mechanism 132 of the active controller 130 writes to the standby controller 150 command/reply queue 162 (such, as with a PCI burst write transaction).

At 210, the active controller 130 asserts or drives an interrupt to the standby controller 150 which is sampled by the redundancy messaging mechanism 152 on the host PCI bus 120. In response, the redundancy messaging mechanism 152 checks its command/reply queue 162. If this checking or queue processing indicates a message was received, the redundancy messaging mechanism 152 processes the message in the message buffer 164 and takes indicated actions. For example, the message indicate that data was transferred into the data buffer 166, and the redundancy messaging controller 152 reacts at 214 by moving the data from the ICL data buffer 166 to a designated location in memory 160 or to another memory device (not shown) in the standby controller 150 such as cache or other global data location for later use by the standby controller 150, such as when the standby controller 150 becomes a master or active controller. As will be discussed with the transfer modes shown in FIG. 3, the redundancy messaging mechanism 152 preferably is able to determine from the message and/or data whether all data in the current transaction has been transferred to the buffer 166 or whether another transfer is required and to appropriately address/store the data transferred at 214 (e.g., relate later transferred data to the data being moved to cache or other memory).

After the redundancy messaging mechanism 152 has completed transfer of the data from the buffer 166, the mechanism 152 at 218 writes a reply to the command/reply queue 142 of the active controller 130. Again, this is performed to protocol requirements of the host PCI bus 120, such as asserting a request and receiving a grant signal from the host arbiter. The redundancy messaging mechanism 152 of the standby controller 150 makes the active controller 130 aware of the reply by driving an interrupt to the active controller 130 which is sampled or received by the redundancy messaging mechanism 132. In response to the interrupt, the redundancy messaging mechanism 132 checks at 224 the command/reply queue 142 to get the reply written by the standby controller 150. If appropriate, the active controller 130 via the mechanism 132 acts to free its memory 140 (such as message and data buffers 144, 146) and signal or otherwise indicate that the ICL or standby data buffer 166 has been freed up or is available for further messaging transactions.

In another embodiment of the invention, the interrupt is automatically created locally without requiring a dedicated signal over the host bus 120. The messaging mechanisms 132, 152 utilize controller memory 140, 160 that is mapable externally on the host PCI bus 120. The controller memory 140, 160 includes a specified interrupt range. Writes to this range of memory 140, 160 generate interrupts to the messaging mechanism 132, 152 of the controller 130, 150 in which the memory 140, 160 resides. The interrupt may be handled or generated by a number of devices within the controllers 130, 150 such as the redundancy messaging mechanisms 132, 152 themselves or more preferably, by a memory controller (not shown but which are typically provided in RAID and other storage controllers). During operation, a sending controller 130, 150 writes data, as a message, directly to the specified interrupt range of the other controller's memory 140, 160. This write causes an interrupt to be driven locally to the redundancy messaging mechanism 132, 152 within the receiving controller 130, 150 from its own memory 140, 160. Significantly this embodiment of the invention does not require a dedicated interrupt signal (which may not be present with some host bus 120 transport protocols).

Referring now to FIG. 3, additional features of an exemplary ICL messaging process 300 are illustrated. The ICL messaging process 300 is typically carried out fully by the redundancy messaging mechanisms 132, 152 (or with assistance from the controller CPUs 134, 154) and provides a number of data transaction or transfer modes to better facilitate efficient and effective communication between the controllers 130, 150 over the host PCI bus 120. The process 300 begins at 302 such as with an active controller 130 determining that a message or signal should be sent to the standby controller 150. At 304, the redundancy messaging mechanism 132 determines which type of transfer mode is suited for the particular circumstances that exist. The illustrated messaging process 300 illustrates four transfer modes that can be selected from and performed by the mechanism 132.

At 310, the mechanism 132 has selected an immediate data mode in which data is to be included in the transfer. In this mode, all the data is available and can be transferred in a single burst. The message is built by the mechanism 132 and the message and all data buffers of the standby controller 150 are allocated at 312 for the transfer. At 314, the active controller 130 acts to write the message to the standby message buffer 164 with the message indicating an immediate or all data transfer and to write the data to the data buffers 166. At 316, the active controller 130 writes to the command/reply queue 162 of the standby controller 160. At 318, the standby controller 150 functions, such as via the redundancy messaging mechanism 152, to process the message and data in the queues and buffers 162, 164, 166 and to reply to the active controller by writing to its command/reply queue 142. This transfer mode ends with the active controller 130 freeing its message and data buffers 144, 146 upon receipt and processing of the reply.

At 330, the redundancy messaging mechanism 132 has selected the partial data transfer mode in which only a partial data transfer is appropriate (all data not available or too much to be transferred in single burst transfer). At 330, the message is built and at 332, the mechanism 132 writes to the standby message buffer 164 a message indicating a partial data transfer and writing the partial data to the data buffers 166. At 334, the active redundancy messaging mechanism 132 acts to write over the host PCI bus 120 to the command/reply queue 162. The standby controller 150 at 336 processes the message in the message buffer 164 and allocates storage structure. The controller 150 also processes the first (or current) batch of the partial data in the data buffers 166. The standby redundancy messaging mechanism 152 then acts to reply to the first (or current) message in order to free the message and data buffers used to transfer the current partial data. Another partial data mode at 330 is then begun until all data is transferred. The message built and written by the active controller 130 is in this fashion incremented or changed until a final or last batch of data bit or indicator is set-in the message to allow the standby controller 160 to determine when a last batch of data has been received.

At 350, the redundancy messaging mechanism 132 has selected a no data transfer mode and builds a message. The message is written at 352 to the standby message buffer 164 over the host PCI bus 120. At 354, the redundancy messaging mechanism 132 writes to the command/reply queue 162. The standby redundancy messaging mechanism 152 then at 356 processes the message such as in response to a sampled interrupt. At 358, the standby redundancy messaging mechanism 152 replies or responds by writing a reply to the messaging queue 142 of the active controller 130.

At 360, the redundancy messaging mechanism 132 of the active controller 130 has selected a data only transfer mode. In this mode, the data is written at 362 to the standby data buffers 166 over the host PCI bus 120. At 364, the active redundancy messaging mechanism 132 writes to the command/reply queue 162. At 366, the standby redundancy messaging mechanism 152 processes the data in the buffer 166. This processing typically includes matching the data to an earlier received message identifier which enables proper storing of the data for later accessing by the standby controller 150 with related data. At 368, the standby controller 150, replies to the active controller 130 by writing to its command/reply queue 142.

Throughout the command/reply queues 142, 162 may take a number of forms to be useful for storing information useful in processing messages and data written in the buffers 144, 146, 164, 166. For example, but not as a limitation, each field in the queues 142, 162 may be a 32-bit field with the value of bit indicating appropriate processing. In one embodiment, one bit is used to indicate whether a message has been written in the buffers, whether a message with data has been written, and whether a reply has been received to a transferred message (with or without data). A number of other bits in the queue fields may provide an index to the message buffers 144, 164. The other bits or portions of the queue fields may be utilized for additional transfer of information.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

We claim:

1. A data array system for providing a host computer device having a host bus redundant access to a data storage device, comprising:
an active controller linked to the host bus and the data storage device, the active controller including a messaging mechanism for transmitting the messages and data over the host bus; and
a standby controller linked to the host bus and the data storage device, the standby controller including message and data buffers for storing the messages and data, whereby the host bus functions as an inter-controller-link to transfer data and controller information between the active controller and the standby controller.

2. The system of claim 1, wherein the host bus is a peripheral component interconnect (PCI) bus.

3. The system of claim 2, wherein the active and the standby controllers are PCI-compliant devices.

4. A data array system for providing a host computer device having a host bus redundant access to a data storage device, comprising:
an active controller linked to the host bus and the data storage device, the active controller including a messaging mechanism for transmitting the messages and data over the host bus; and
a standby controller linked to the host bus and due data storage device, the standby controller including message and data buffers for storing the messages and data, whereby the host bus functions as an inter-controller-link; wherein the standby controller includes a queue for storing a signal identifier and wherein the messaging mechanism of the active controller writes the signal identifier over the host bus to the standby queue to provide processing information for the transmitted messages and data.

5. The system of claim 4, wherein standby controller includes a messaging mechanism configured to process the signal identifier in response to an interrupt from the active controller and to process the stored messages and data based on the signal identifier.

6. The system of claim 5, wherein the signal identifier indicates the stored messages and data as a message-only transfer, a message-with-data transfer, or a message-with-partial data transfer.

7. The system of claim 6, wherein the standby messaging mechanism moves data in the data buffer to memory as part of the processing of the stored messages and data.

8. The system of claim 7, wherein the active controller includes a reply queue and the standby messaging mechanism replies to the transmitted messages and data by writing a reply message to the reply queue indicating messaging can be transmitted by the active controller.

9. A method for providing inter-controller communications between an active controller and a standby controller configured for redundant communications between a host and a storage device and linked to a host bus, comprising:
at the active controller, building a message;
with the active controller, transferring the message to the standby controller via the host bus;
with the active controller, writing to a command/reply queue at the standby controller;
with the standby controller, checking the command/reply queue for a next message; and
upon detecting the next message, processing with the standby controller the transferred message.

10. The method of claim 9, further including driving an interrupt with the active controller to standby controller and wherein the checking is performed in response to the standby controller sampling the interrupt.

11. The method of claim 10, further including with the active controller transferring data with the message, and wherein the transferred message indicates a presence or absence of the data.

12. The method of claim 11, wherein the message defines the data as all or partial and wherein the standby controller stores the data based on the all or partial data definition.

13. The method of claim 9, further including after the processing, with the standby controller writing to a reply queue at the active controller to indicate the processing is complete.

14. A data storage system with redundant data storage, comprising:
a host processor;

an active controller controlling access by the host processor to data storage devices;

a standby controller controlling access by the host processor to the data storage devices; and a host bus communicatively linking the host processor, the active controller, and the standby controller, wherein the active and standby controllers include redundancy messaging mechanisms configured to assert and sample signals on the host bus to provide inter-controller communications over the host bus.

15. A data storage system with redundant data storage, comprising:

a host processor;

an active controller controlling access by the host processor to data storage devices;

a standby controller controlling access by the host processor to the data storage devices; and a host bus communicatively linking the host processor, the active controller, and the standby controller, wherein the active and standby controllers include redundancy messaging mechanisms configured to assert and sample signals on the host bus to provide inter-controller communications over the host bus; wherein the standby controller includes a command/reply queue for registering receipt of new messages and a message buffer for storing messages, and wherein the active redundancy mechanism transfers messages to the message buffer of the standby controller and writes to the command/reply queue to indicate the transmittal of the messages.

16. The system of claim 15, wherein the active redundancy mechanism asserts an interrupt to the standby controller over the host bus and the standby redundancy mechanism responds to the interrupt by checking the command/reply queue.

17. A data storage system with redundant data storage, comprising:

a host processor;

an active controller controlling access by the host processor to data storage devices;

a standby controller controlling access by the host processor to the data storage devices; and a host bus communicatively linking the host processor, the active controller, and the standby controller, wherein the active and stand by controllers include redundancy messaging mechanisms configured to assert and sample signals on the host bus to provide inter-controller communications over the host bes; wherein the standby controller includes a data buffer and wherein the active redundancy messaging mechanism transfers data corresponding to the message over the host bus to the data buffer.

18. The system of claim 17, wherein the standby redundancy messaging mechanism transfers the data from the data buffer to another memory device to enable receipt of additional data and transmits a signal to the active controller upon completion of the transfer of the data out of the data buffer.

19. The system of claim 18, wherein the signal includes writing to a reply queue at the active controller and transmitting an interrupt to the active controller.

20. The system of claim 14, wherein the host bus is a peripheral component interconnect (PCI) bus and the active and standby controllers are PCI-compliant devices.

21. A method for providing inter-controller communications between an active controller and a standby controller configured for redundant communications between a host and a storage device and linked to a host bus, comprising:

at the standby controller, specifying a range of memory in the standby controller as an interrupt range;

with the active controller, writing data via the host bus to the interrupt range of the standby controller; and at the standby controller, driving a local interrupt.

22. The method of claim 21, wherein the interrupt driving is performed with a memory controller in the standby controller.

23. The method of claim 21, further including after the interrupt driving, with the standby controller writing to a reply queue at the active controller.

24. A computing device comprising:

a host central processing unit (CPU);

a host bus communicatively coupled to the host CPU;

at least one data storage device;

an active controller linked to the host bus and the at least one data storage device, the active controller including a messaging mechanism for transmitting the messages and data over the host bus; and, a standby controller linked to the host bus and the at least one data storage device, the standby controller including message and data buffers for storing the messages and data, whereby the host bus functions as an inter-controller-link configured to transfer data and message information between the active and standby controllers and wherein upon a failure of the active controller the inter-controller-link provides both data and message transfer within the computing device such that the host CPU can cause the standby controller to access data from the at least one data storage device.

25. A data array system for providing a host computer device having a host bus redundant access to a data storage device, comprising:

an active controller sub-system linked directly to the host bus and the data storage device, the active controller sub-system including a messaging mechanism for transmitting messages and data over the host bus; and, a standby controller sub-system linked directly to the host bus and the data storage device, the standby controller sub-system including message and data buffers for storing the messages and data, whereby the host bus functions as a redundant inter-controller-link to transfer data and controller information between the active controller sub-system and the standby controller sub-system, such that upon failure of either of the active controller subsystem and the standby controller sub-system the host computing device maintains access to the data storage device.

* * * * *

UNITED STATES PATENT AND TRADEMARK OFFICE
CERTIFICATE OF CORRECTION

PATENT NO. : 7,093,043 B2  Page 1 of 1
APPLICATION NO. : 10/034138
DATED : August 15, 2006
INVENTOR(S) : Choon-Seng Tan et al.

It is certified that error appears in the above-identified patent and that said Letters Patent is hereby corrected as shown below:

In column 10, line 8, in Claim 4, delete "due" and insert -- the --, therefor.

In column 11, line 45, in Claim 17, delete "stand by" and insert -- standby --, therefor.

In column 11, line 48, in Claim 17, delete "bes" and insert -- bus --, therefor.

Signed and Sealed this

Twenty-eighth Day of July, 2009

JOHN DOLL
*Acting Director of the United States Patent and Trademark Office*